April 21, 1970  E. W. ULBRICHT  3,507,242
TANKER FOR THE TRANSPORTATION OF LIQUEFIED GASES
Filed March 14, 1968  5 Sheets-Sheet 1

INVENTOR
EBERHARD W. ULBRICHT
BY
*Stevens, Davis, Miller & Mosher*
ATTORNEYS

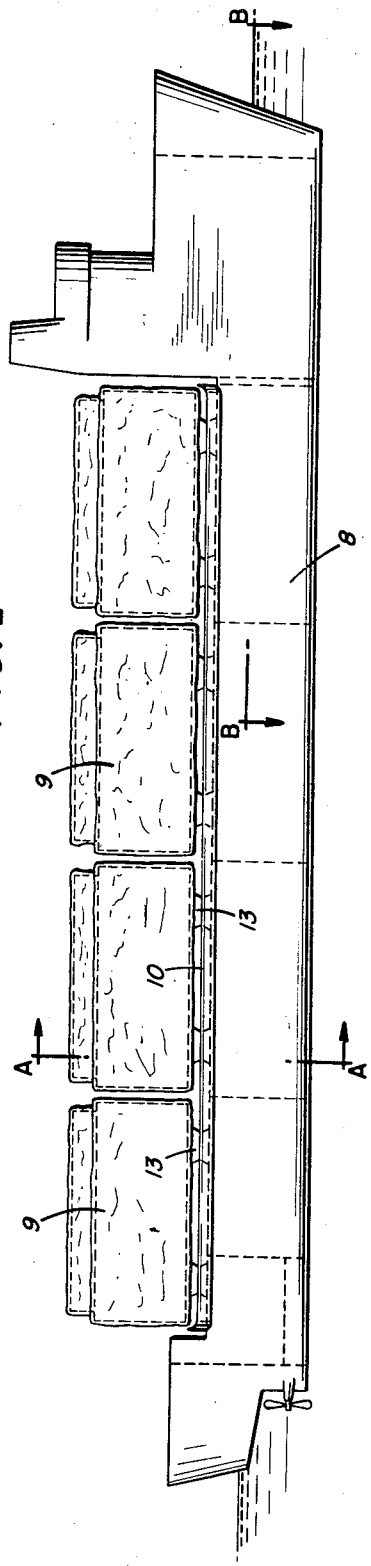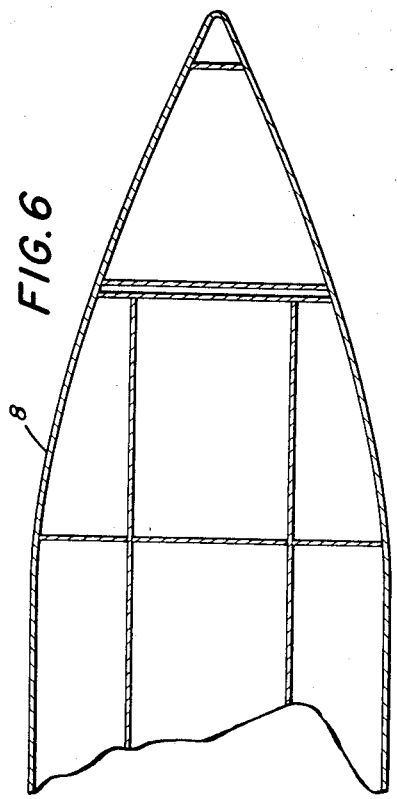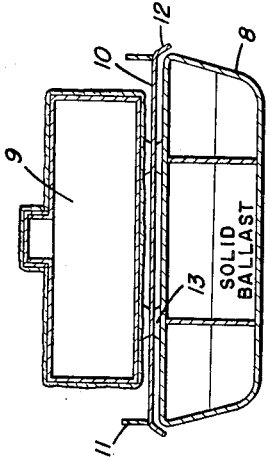

April 21, 1970 E. W. ULBRICHT 3,507,242
TANKER FOR THE TRANSPORTATION OF LIQUEFIED GASES
Filed March 14, 1968 5 Sheets-Sheet 3
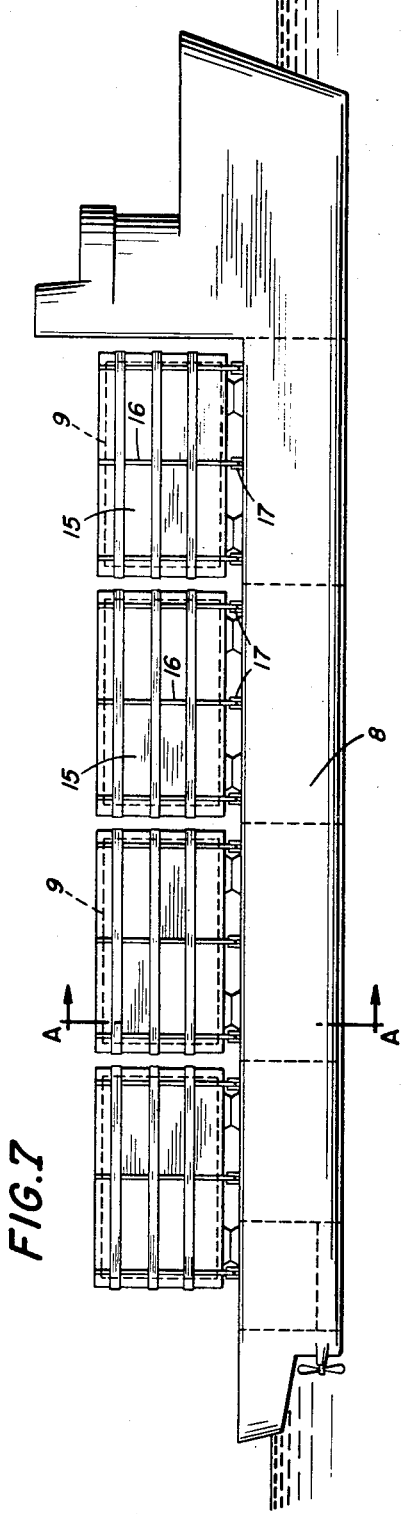
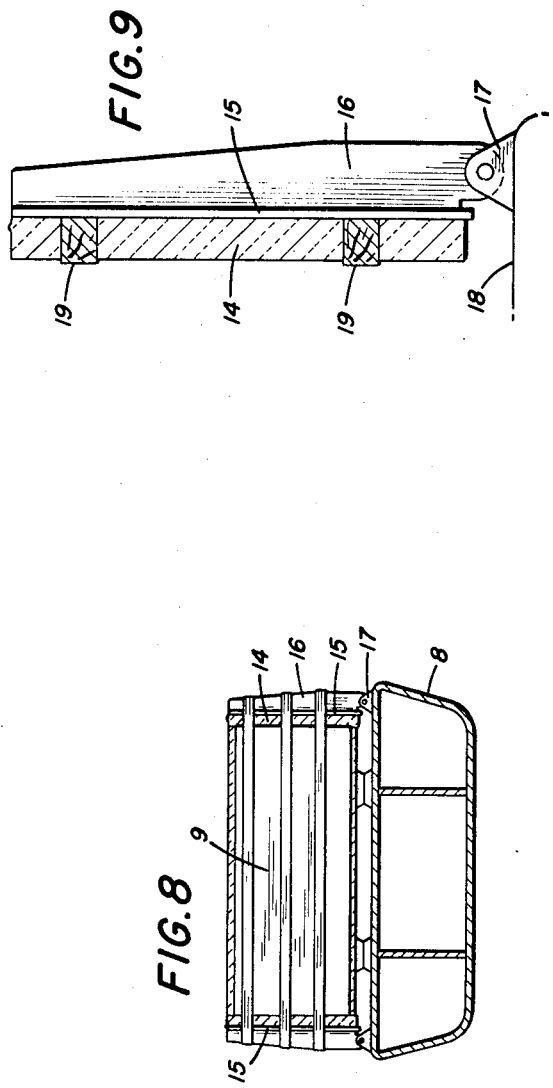
INVENTOR
EBERHARD W. ULBRICHT
BY
ATTORNEYS

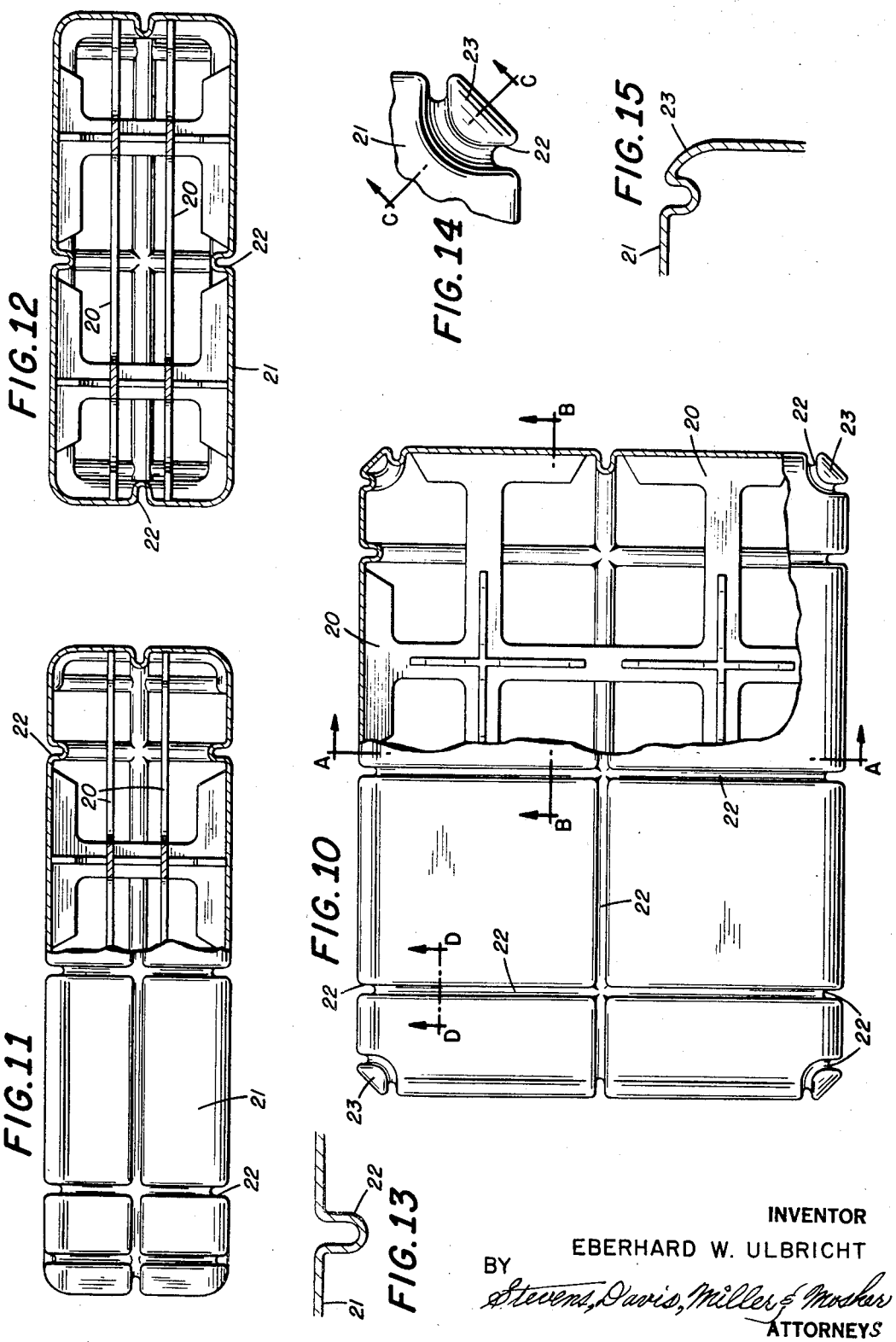

April 21, 1970     E. W. ULBRICHT     3,507,242
TANKER FOR THE TRANSPORTATION OF LIQUEFIED GASES
Filed March 14, 1968     5 Sheets-Sheet 5
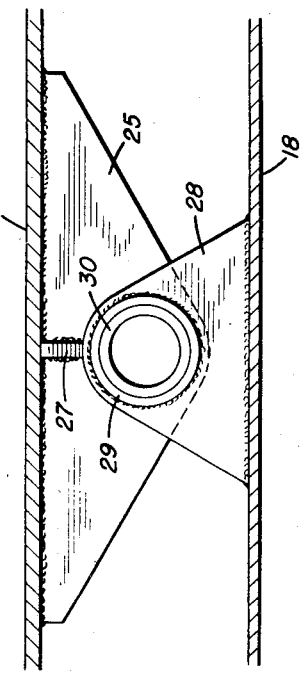
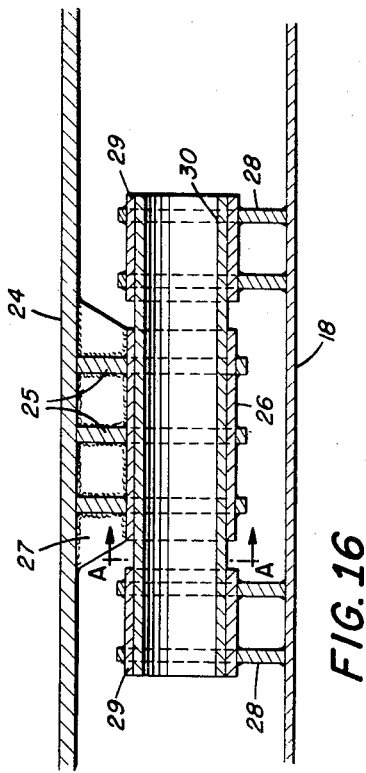
INVENTOR
EBERHARD W. ULBRICHT
BY
ATTORNEYS 3,507,242
TANKER FOR THE TRANSPORTATION OF
LIQUEFIED GASES
Eberhard Walter Ulbricht, Hamburg, Germany, assignor to John Joseph McMullen, Montclair, N.J.
Filed Mar. 14, 1968, Ser. No. 713,115
Claims priority, application Germany, Mar. 17, 1967,
M 73,232
Int. Cl. B63b 25/16
U.S. Cl. 114—74                                      15 Claims

ABSTRACT OF THE DISCLOSURE

A ship separated in a horizontal plane into a lower floating body of ordinary shipbuilding steel and an upper tank part of a material resistant to low temperatures. The tank part is connected with the deck of the floating body but is not completely surrounded by the floating body. A covering is located on the deck of the floating body, which covering is resistant to low temperatures.

---

The present invention relates to a tanker for the transportation of liquefied gases, particularly methane, at approximately atmospheric pressure. The known tankers of this type have in the hull large spaces in which the tanks for the liquefied gas are arranged. Since the liquefied gas has a temperature which is less than —160° C., it would lead, within a relatively short period of time in case of contact with the ship's walls consisting of traditional shipbuilding steel, to an embrittlement of the hull, and the latter would then no longer be able to withstand the water pressure at the embrittled places. For this reason, as is known, in the traditional tankers for liquefied gases, special measures must be taken to prevent emergence of the liquefied gas into the receiving spaces provided in the hull. In particular, in each case, two container walls which are in themselves sufficient to take up the internal pressure of the tank must be provided so that in case of a leak of the inner container the liquefied gas will still be intercepted in the outer container and will be prevented from emerging into the hull, Furthermore, extensive, complicated leakage-detection devices must be provided in the space between the two walls in order to be able immediately to detect any possible leaks and repair them promptly. A further considerable expense results from the fact that, before the introduction of the liquefied gas, not only the inner container wall, but also the outer container wall must be cooled. Further difficulties result from the fact that between the ship's walls and the outer walls of the tanks, and possibly also between the two tank walls, there must be provided passages which can be walked through in order to permit examination of, or repairs to, the container walls. If repairs are necessary, particularly on the insulating layers which must be present, then as a rule the ship must be placed out of operation during the time of the repair, which means great loss. Disadvantages, furthermore, result from the fact that heating devices, bilge pumps, and the like must be provided for the intermediate spaces between the tank outer walls and the inner walls of the ship, that the pumps for the emptying of the tanks must be arranged at the top thereof, and the like.

The object of the present invention is to develop a tanker for the transportation of liquefied gases, and particularly methane, in such a manner that all the above-indicated disadvantages are avoided in a simple and economic manner.

This objective is obtained in accordance with the invention in the manner that the ship is separated in a horizontal plane into a lower floating body of ordinary shipbuilding steel and an upper tank part of material resistant to low temperatures, the tank part being connected with the deck of the floating body but not being surrounded by the floating body, and the deck of the floating body having a covering which is resistant to low temperatures. The invention will, therefore, consist essentially in the fact that, deviating from the previously known construction of tankers for liquefied gases, the tanks are no longer arranged within a hull of known form which makes necessary the above-described measures for the preventing of the injurious action of the liquefied gases on the ship's walls, but that, rather, the tanks are arranged on the deck of a floating body which is necessarily correspondingly wide in order to obtain high form stability due to the change in height of the center of gravity, whereby injurious action of the liquefied gas emerging from the tanks in case of the occurrence of leaks on the floating body is prevented by the cold-resistant covering of the latter.

Since the tank part which, as a further development of the invention, preferably consists of a plurality of individual tanks of parallelepiped shape between which traversable spaces are provided, and the width of which is somewhat less than the width of the floating body so that the sidewalls are also readily accessible, is arranged on the deck of the floating body, no consideration need be taken any longer in shaping the hull of the floating body of the tanks so that a shape which is more favorable for flow, and thus the obtaining of greater speed with constant drive force and constant tank volume is possible. The weight of the floating body, and thus also the cost of manufacture, is reduced substantially as compared with traditional tankers, since the floating body can have a considerably smaller height than the hull of the known tankers. On the other hand, the tanks can also be constructed in very simple manner, since the necessity of a second tank wall, for leakage detecting devices, means for flushing the space between the two tank walls with inert gases, for cooling the outer wall of the tank down, and for providing pumps on the top of the tank no longer exists. The tanks can be examined at any time from all sides, and the repairing of any possible damage is possible without it being necessary for the entire ship to be taken out of traffic for a long time. In particular, in case of repair work, it is not necessary to remove ship's parts in order to create space for the work. The same applies to repair work on the insulating layer surrounding the tanks.

The cooling and heating of the tank walls can be effected in a simpler and less dangerous manner, since it is not necessary to take into consideration two tank walls which are connected together at given places.

Another advantage is that the ship's crew can no longer be endangered by the emergence of gas from safety valves or the like, since the tanks are surrounded on all sides by fresh air, and emerging gases pass directly into the atmosphere.

No longer need unutilized spaces be provided between the tank outer walls and the ship's walls, the traversing of which is dangerous and which make heating means, bilge pumps, and the like necessary. Rather, the floating body can, on its part, be used for the transportation of goods. To be sure, it is advisable for solid ballast to be arranged in the lower part of the floating body in order to increase the stability of the tanker in accordance with the invention.

As a further development of the invention, the tanks can be connected with the deck of the floating body by means of stationary supporting devices of high resistance to heat conduction, as well as supporting devices of that type which are movable as a function of the movements of the tank bottom caused by temperature. In this way, the contraction or expansion of the tank walls is taken into consideration, and, at the same time, space is created for inspections and repair work between the deck and its cold-resistant covering, on the one hand, and the container bottom, on the other hand.

In accordance with a further additional feature of the invention, which can possibly, however, also be applied independently of the features described above, supporting devices of high resistance to thermal conduction, which are provided between the tanks and a floating body, can be so developed that there are provided on the tank walls and on the floating body metallic supporting elements, each of which is fastened at one end to the tank walls or to the floating body and bear at the opposite end bushings with aligned bore holes, that each supporting device consists of carrying elements of the tank and of the hull arranged symmetrically to each other, and that the individual carrying elements of each supporting device are connected by a metal tube supported in the bushings. In this way, the removal of cold on the parts of the floating body bearing or surrounding the tank is reduced to a minimum without special insulating material being necessary for the carrying elements, since, due to the tubes which connect the bushings of the carrying elements with each other and their low thermal conduction cross section, only a very slight transfer of cold can take place, while, on the other hand, a large heat exchange surface is available on the inner wall of the connecting pipes, particularly if the pipe has a diameter which is very large as compared with its wall thickness. In order to make the expansion and contraction movements of the container wall surfaces relative to the surfaces of the floating body possible, spaces in axial direction can be provided between the bushings of the carrying elements of each supporting device and the bushings of the carrying elements of one side and, therefore, of the tank or of the floating body, can be slidably supported on the pipe. Upon changes in temperature, then the bushings of the corresponding side merely shift on the connecting pipe, in which connection the spaces must be adapted for the greatest possible temperature dependent movement.

In accordance with another advantageous development of the inventive concept which has just been described, means can be provided for removing cold from the inner wall of the pipes of the supporting devices, preferably air blowers. In this way, the heat exchange at the pipe inner walls is further increased, and the removal of cold on the surrounding parts of the floating body is further reduced or even entirely prevented.

In accordance with another development of the invention, which, once again, can also be used independently of the inventive features described above, and particularly also in the case of stationary tanks, each of the parallelepiped-shaped tanks can have, in known manner, a tank shell consisting of cold-resistant material and an inner skeleton-like carrying structure bearing the shell, and the tank shell can be subdivided into individual fields which are connected with each other by expansion joints formed from the material of the shell. In this way, the result is obtained that upon the cooling of the tank different thermal stresses resulting from not absolutely uniform cooling of all the parats of the shell cannot have an injurious effect, since different thermal expansions of the individual fields act only in the expansion folds or expansion joints where they are non-injurious. It is advantageous, in this connection, for the expansion joints to be directed towards the inside of the tanks and for the carrying structure to have corresponding interruptions through which the expansion joints extend. As a further development of the features which have just been described and possibly, however, also in the case of tanks without subdivision of the tank shell into individual fields, the tank corners of the parallelepiped-shaped tanks can consist of shell parts which are cylindrically curved only in one direction and are connected with the tank walls via expansion joints formed of the material of the shell. Heretofore, very special problems arose at the corners of parallelepiped-shaped tanks upon cooling, since three-dimensional stress phenomena occur here. The corners of the tanks were, therefore, made spherical in order to achieve the best possible resisance. By this spherical development of the corners, on the other hand, however, high additional expanses resulted. If, in accordance with the invention, the shell is merely cylindrical curved in the corner region, in which connection the radius of the curvature can change continuously over the entire region of curvature, then the required expense is considerably less. The thermal stresses and thermal movements of the tank wall cannot reach the corner part, but are taken up safely by the expansion joints.

Finally, it is advantageous, in accordance with the invention, for the tanks having only one wall to be surrounded by insulating plates which rest loosely against the tank walls and are fastened to sheet metal plates which are resistant to the action of the waves and are supported on the deck of the floating body. In the known tanks, the insulation is always fastened to the tank walls so that the thermal expansions of the tank must be taken into account in cumbersome fashion as a result of which the construction is greatly increased in cost. By the insulating plates of the invention, which lie loosely against the outside of the tank walls and are connected with the sheet metal plates, the same insulating effect is obtained and with the traditional insulating layers, but at considerably less expense. It is advantageous in this connection for the sheet metal plates to be provided with pressure pieces which extend through the insulating plates and rest against the tank walls and consist of hard heat-insulating material, for instance, balso wood. The pressures occurring upon the impact of the waves then do not act on the material of the insulating plates but, rather, via the pressure pieces, directly on the tank walls which are sufficiently resistant. On the tank corners, the insulating plates can suitably be connected with each other via elastic connecting elements. Furthermore, the sheet metal plates with the insulating plates can be pivoted, swingable about horizontal axes, to bearing pedestals on the deck of the floating body whereby, on the one hand, an adaptation to the thermal expansions of the tank is made possible, and, on the other hand, the inspection of the tank walls is greatly simplified, since for this the plates need merely be swung away.

The invention is described in further detail in the following description, read with reference to the drawings, in which:

FIG. 4 is a side view of a tanker for liquefied gases developed in accordance with the invention;

FIG. 5 is a cross section along the line A—A of FIG. 4;

FIG. 6 is a horizontal partial longitudinal section along the line B—B of FIG. 4;

FIG. 7 is another showing of a tanker in accordance with the invention with insulating devices for the container walls;

FIG. 8 is a cross section along the line A—A of FIG. 7;

FIG. 9 is an enlarged showing of the insulating plates of FIG. 8 with their fastening devices;

FIG. 10 is a top view of a liquid tank developed in special manner in accordance with the invention, with indication of the skeleton-like carrying structure;

FIG. 11 is a partial section along the line B—B of FIG. 10;

FIG. 12 is a section along the line A—A of FIG. 10;

FIG. 13 is an enlarged partial section along the line D—D of FIG. 10;

FIG. 14 is an enlarged showing of a corner of the tank of FIG. 10;

FIG. 15 is a partial section along the line C—C of FIG. 14;

FIG. 16 is a longitudinal section through a tank supporting device developed in accordance with the invention;

FIG. 17 is a side view of the supporting device of FIG. 16; and

FIG. 18 is a cross section along the line A—A of FIG. 16.

Figure 1:
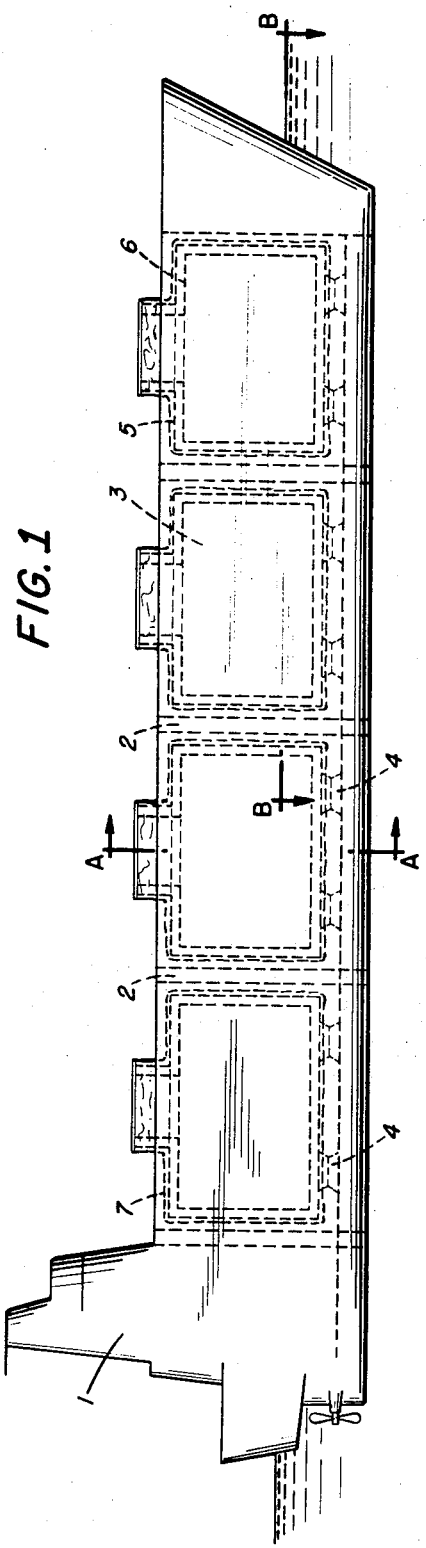
FIG. 1 shows a traditional tanker for liquefied gases of very low boiling point, such as methane, showing the gas tanks and transverse bulkheads present within the ship, as well as supports, in dotted lines.
Figure 3:
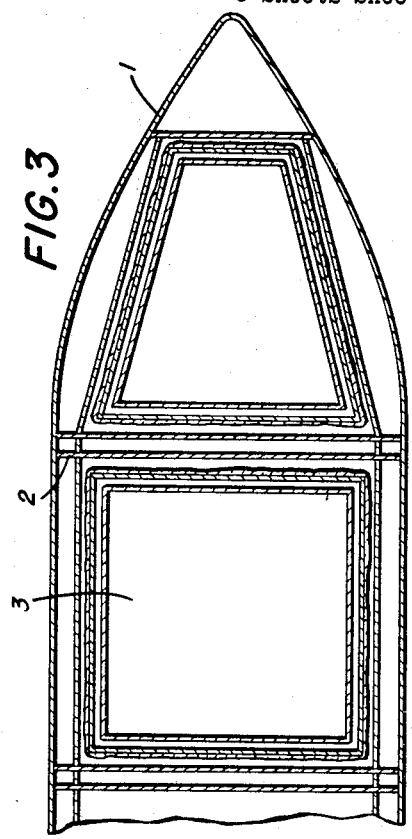
FIG. 3 is a horizontal partial section along the line B—B of FIG. 1.
Figure 2:
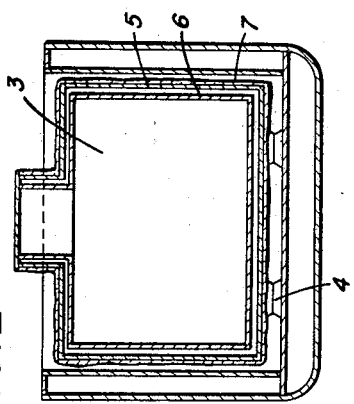
FIG. 2 is a cross section along the line A—A of FIG. 1.

As shown in FIGS. 1–3, in the traditional tankers 1 for the transportation of liquefied gases of very low boiling point, tank containers 3 are arranged in hollow spaces formed by transverse bulkheads 2, the containers being supported via heat-insulating supports 4 on the ship's bottom. For the reasons described above, the containers 3 are developed with two walls 5 and 6, and the outer wall 5 is surrounded by an insulating layer 7. The difficulties resulting from this tanker construction have been described in detail in the preamble. FIG. 3, in particular, shows that in order to obtain good utilization of space in the fore ship, there results a shape thereof of rather unfavorable flow configuration whereby the speed obtainable is impaired as compared with ships of the same size and the same drive but with a more favorable form of the hull.

FIG. 4 shows the proposal in accordance with the invention for the new development of a tanker for liquefied gases. The ship consists of a floating body 8 and a tank part located over the floating body which, in the embodiment shown, consists of four individual tanks 9 which are arranged one above the other on the deck of the floating body 8, leaving traversable spaces between them. As FIGS. 4 and 5 show, between the tanks 9, which are made with one wall of cold-resistant material, and preferably aluminum for reasons of better stability, and the floating body 8, consisting of ordinary shipbuilding steel, there is arranged a cover plate 10 of aluminum or some other cold-resistant material, which protects the floating body 8 from impairment by any liquid of low temperature which may emerge from the tanks 9. By lateral walls 11, the covering 10 can also be developed with a trough shape; furthermore, it is advisable for it to have at the ship's sides downward bent edges 12, which prevent any liquid which might emerge from reaching the side surfaces of the floating body.

In order to obtain good stability of the tanker, the floating body 8 is developed very wide with relatively slight depth. Solid ballast can possibly be provided at the bottom of the floating body in order further to improve the stability particularly if a smaller width than shown in FIG. 5 is selected.

As shown by FIG. 6, the development in accordance with the invention makes it possible to make the hull more slender in the region of the fore ship in the plane of the waterline without the transportation capacity of the ship being affected thereby. By this slenderer shape of the hull, it is possible to obtain higher speeds than with the traditional transport vessels for liquid gases. The supporting devices for the supporting of the tanks 9 on the deck of the floating body 8, which will be discussed in detail further below, are designated 13 in FIGS. 4 and 5.

FIGS. 7–9 show a particularly suitable arrangement of the insulation for the liquefied gas tanks of the tanker in accordance with the invention. Deviating from the traditional development of the tanks, the sidewall insulation is no longer arranged fixed on the tank walls, and, therefore, no longer participates in the expansions and shrinkages of the tank walls caused by the temperature. Rather, insulating plates 14 are fastened to sheet metal plates 15, which, in their turn, are swingably pivoted by welded straps 16 to bearing pedestals 17 which are fastened on the deck 18 of the floating body 8. The sheet metal plates 15 are so developed that they can withstand the striking of the waves. The forces acting in this connection on the sheet metal walls 15 are transmitted via pressure pieces 19 of hard heat-insulating material, such as balsa wood, to the walls of the tanks 9. By the swingable supporting of the insulating plates on the bearing pedestals 17, it becomes possible for the insulation readily to adapt itself also to the thermal expansions directed perpendicular to the plane of the plate 15 and for it, furthermore, to be capable of being easily swung away for inspection of the tank walls. At the edges of the tank container 9, the plates 14, 15 can be connected by elastic intermediate pieces.

In the advantageous embodiment of a tank in accordance with the present invention shown in FIGS. 10–15, which can also be used in other tankers and even in stationary tanks, the tank shell is of thick sheet, for instance, aluminum sheet, and is supported by an inner skeleton-like carrying frame 20. In order now to prevent the thermal stresses occurring upon the cooling of the tank to the operating temperature of less than −160° C. from having injurious effects as a result of irregular cooling of individual parts of the tank, the tank shell 21 is, in accordance with the invention, divided into individual fields by expansion joints 22, which consist of the sheet material and are integral with the tank shell, these joints being shown on a larger scale in FIG. 13. The thermal expansions, therefore, in all cases act only up to the next expansion joint, where they are taken up and counteracted without difficulty by the expansion joints extending inward between interruptions of the carrying frame 20.

In accordance with the invention, there are no longer provided at the tank corners as customary spherically developed sheet metal parts in order to be able to take up the thermal stresses which act there in three planes, but, rather, the corner parts 23 are merely cylindrically curved as shown in FIGS. 14 and 15, but are connected via expression joints 22 with the container shell 21. This special development of the tank corners can also be employed independently of the features described above and also in stationary tanks to particular advantage.

FIGS. 16–18 show the special development of the supporting devices 13 in accordance with the invention. The supporting devices in accordance with FIGS. 16–18 can possibly also be used—independently of the special development of the tanker in accordance with the invention—in traditional ship's tanks and stationary tanks for liquefied gases.

To the lower tank wall 24 there are welded carrying elements 25, which jointly surround a bushing 26 and are welded to it. For better stiffening, a carrying element 27 extending in longitudinal direction is also welded between the tank walls 24 and the bushing 26.

On the deck 18 of the floating body 8, there are welded carrying elements 28 which are welded at their free ends to bushings 29. The bushings 26 and 29 which are aligned with each other are now connected with each other by a pipe 30, via which the pressure of the tank 9 acting on the bushing 26 is transmitted to the bushings 29, the carrying elements 28, and the deck 18. A removal of cold from the container wall 24, which is at low temperature, to the deck 18 which, in the case of the development of the tanker in accordance with the invention, bears the cold-resistant covering can, however, only take place over the heat-conduction cross section of the pipe 30 in accordance with FIG. 18 so that a very large heat-conduction resistance is obtained without the use of insulating material. The heat exchange surface, which is already very large, on the inside of the pipe 30 can possibly also be heated by special devices, not shown in the drawings, in order to prevent any cold conduction to the surface 18 or limit it to a minimum. As can be noted from the drawings, between the bushings 26 and 29, there are provided spaces so that the bushing 26, which is slidably supported on the pipe 30, can move on the pipe 30 in case of thermal expansion of the container bottom 24.

What is claimed is:

1. Tanker for the transportation of liquefied gases particularly methane, at approximately atmospheric pressure, comprising in combination a ship fabricated as an elongated floating body from ordinary shipbuilding steel and having an upper deck, a series of tanks fabricated from cold-resistant material longitudinally spaced along the upper deck of said ship, thermal insulating means supporting said tanks spaced above the upper deck of said ship, and a cover of cold-resistant material extending between the bottom of said tanks and the upper deck of said space and being spaced from the latter, said cover being open to the atmosphere and defined by means of a flat cover plate substantially parallel to the upper deck and coextensive with the area beneath the tanks, lateral wall means at the periphery of and extending upward from the cover plate, and liquid-directing means at the outboard edges of the cover plate extending outward and downward and extending more outboard than the upper deck and the hulls of the ship, the cover serving to collect any leakage from said tanks and lead same to a point outboard of the extremities of the upper deck of said ship to prevent under all circumstances liquefied gas from contacting the upper deck or other parts of said ship.

2. Tanker according to claim 1, wherein the tanks are rectangular in shape and of a width smaller than the beam of the ship.

3. Tanker according to claim 1, wherein solid ballast is provided in the lower part of the ship.

4. Tanker according to claim 1, wherein said thermal insulating means comprises fixed supporting devices of high resistance to thermal conduction slidably interconnected to accommodate temperature-produced movements of the tanks.

5. Tanker for the transportation of liquefied gases, particularly methane, at approximately atmospheric pressure, comprising in combination a ship fabricated as an elongated floating body from ordinary shipbuilding steel and having an upper deck, a series of tanks fabricated from cold-resistant material longitudinally spaced along the upper deck of said ship, thermal insulating means comprising fixed supporting devices of high resistance to thermal conduction slidably interconnected to accommodate temperature-produced movements of the tanks, supporting said tanks spaced above the upper deck of said ship, and a cover of cold-resistant material extending between the bottom of said tanks and the upper deck of said space and being spaced from the latter, said cover being of such extension and such shape as to collect any leakage from said tanks and lead same to a point outboard of the extremities of the upper deck of said ship to prevent under all circumstances liquefied gas from contacting the upper deck or other parts of said ship, and wherein a first group of metallic carrying elements is fastened to the tanks, a second group of metallic carrying elements is fastened to the ship, all of said elements including bushings with bore holes and being arranged in sets with the bore holes aligned with each other, and a metal pipe received in the aligned bore holes of each set and supported in the bushings.

6. Tanker according to claim 5, wherein the pipe has a diameter which is larger in proportion to its wall thickness.

7. Tanker according to claim 5, wherein the bushings of each set are spaced in axial direction.

8. Tanker according to claim 5, further including means for removing cold from the inner wall of the pipe.

9. Tanker according to claim 2 wherein each tank is comprised of a shell and an inner skeleton-like carrying structure bearing the shell, each wall of said shell defining a plurality of expansion joints.

10. Tanker according to claim 9, wherein the expansion joints are directed towards the inside of the tank, and the carrying structure is formed with corresponding interruptions.

11. Tanker according to claim 9, wherein the tank corners are formed of cylindrically curved shell parts and are connected with the shell walls via expansion joints formed in the shell.

12. Tanker according to claim 2, wherein a protective structure comprising insulating plates fastened to metal plates is mounted on said upper deck and rests loosely against the tanks, the mounting of said structure being such as to resist the striking of the waves.

13. Tanker according to claim 12, wherein said structure includes pressure pieces of hard insulating material which extend through the insulating plates and rest against the tanks.

14. Tanker according to claim 12, wherein the insulating plates are connected with each other at the tank corners by means of elastic connecting elements.

15. Tanker for the transportation of liquefied gases, particularly methane, at approximately atmospheric pressure, comprising in combination a ship fabricated as an elongated floating body from ordinary shipbuilding steel and having an upper deck, a series of tanks, each being rectangular in shape and of a width smaller than the beam of the ship, fabricated from cold-resistant material longitudinally spaced along the upper deck of said ship, thermal insulating means supporting said tanks spaced above the upper deck of said ship, and a cover of cold-resistant material extending between the bottom of said tanks and the upper deck of said space and being spaced from the latter, said cover being of such extension and such shape as to collect any leakage from said tanks and lead same to a point outboard of the extremities of the upper deck of said ship to prevent under all circumstances liquefied gas from contacting the upper deck or other parts of said ship, wherein a protective structure comprising plates fastened to metal plates is mounted on said upper deck and rests loosely against the tanks, the mounting of said structure being such as to resist the striking of the waves and wherein the metal plates are pivoted, swingably about horizontal axes, to bearing pedestals mounted on the upper deck of the ship.

References Cited

UNITED STATES PATENTS

| | | | |
|---|---|---|---|
| 3,191,568 | 6/1965 | Schroeder et al. | 114—74 |
| 3,215,301 | 11/1965 | Armstrong. | |
| 3,349,742 | 10/1967 | Bylo | 114—77 |
| 3,422,779 | 1/1969 | Becker. | |

TRYGVE M. BLIX, Primary Examiner

U.S. Cl. X.R.

220—9